United States Patent Office 3,464,965
Patented Sept. 2, 1969

3,464,965
PROCESS FOR PRODUCING POLYBUTADIENES
HAVING REDUCED COLD FLOW TENDENCY
Hidetoshi Yasunaga, Tatsuo Ichikawa, Hiroaki Yamato, and Mitsuru Ikeda, Yokkaichi, Nobuo Ozawa, Tokyo, and Kenichi Ueda, Yokkaichi, Japan, assignors to Japan Synthetic Rubber Co., Ltd., Tokyo, Japan, a corporation of Japan
No Drawing. Filed Sept. 29, 1966, Ser. No. 583,112
Claims priority, application Japan, Oct. 8, 1965, 40/61,503
Int. Cl. C08d 1/14, 3/08
U.S. Cl. 260—94.3          5 Claims

ABSTRACT OF THE DISCLOSURE

A high cis-1,4 polybutadiene having a reduced cold flow tendency or substantially no cold flow tendency is prepared by a process which comprises mixing (A) at least one organonickel compound selected from the group consisting of nickel carboxylates and organic complexes of nickel, (B) at least one boron compound selected from the group consisting of boron trifluoride and the organic complexes thereof, and (C) at least one organoaluminum compound, said mixing being effected in a hydrocarbon solvent in the presence of 0.5–50 moles of a conjugated diolefin per one mole of said nickel compound, followed by ageing said mixture for at least 16 minutes at a temperature ranging between −20° and 120° C. to prepare a catalyst, and thereafter contacting said catalyst with butadiene in a hydrocarbon solvent under an atmosphere of an inert gas at a temperature ranging between −20° and 150° C.

---

This invention relates to a high cis-1,4 polybutadienes having a reduced cold flow tendency or in which substantially no cold flow tendency is set up.

Great progress has been made in the field of elastomers in recent years on account of the discovery of new catalyst systems. Among these, the high cis-1,4 polybutadienes in view of their superior abrasion resistance, low heat build-up and high resilience, are finding wide use in tires, footwear, industrial products and other rubber products, and the amount being used for these purposes in showing an increase.

The high cis-1,4 polybutadienes in their unvulcanized state have, however, a high cold flow tendency and hence this is a problem in the case of their packaging, transportation and storage. The term "cold flow tendency," as herein used, denotes that phenomenon of a polymer wherein the polymer deforms and flows at a temperature near room temperature throughout the year. For instance, if a break occurs in the packaging material, the polybutadiene flows out therefrom to catch the packaging material or dust, and hence reduces its merchandise value. Moreover, the bales become adhered to each other to cause difficulty in their handling. Hence, it becomes necessary to strengthen the package, thus resulting in higher packaging costs. Again, since the bales cannot be stacked high, the storage cost also becomes greater. Further, the undesirable deformation of the unvulcanized compounds thereof is also a drawback from the practical standpoint.

A number of processes have been proposed for either reducing or preventing the cold flow tendency of high cis-1,4 polybutadienes. For example, there is a process of copolymerizing a small amount of a bifunctional monomer such as divinylbenzene, a process of using an oxirane compound or an acid anhydride as a short stop, a process of treating the polymer with such as an organic peroxide, a process of mixing a low intrinsic viscosity polybutadiene with that having a high intrinsic viscosity, or a process of raising the polymerization temperature during the latter stage of the polymerization reaction period.

These processes, however, are not entirely satisfactory, because either they were not effective when the catalyst system was different, or they would reduce the content of cis-1,4 of the polybutadiene, or they would complicate manufacturing process.

In the copending application U.S. Ser. No. 450,194, filed Apr. 22, 1965, it is disclosed that a hydrocarbon-soluble catalyst for the liquid phase polymerization of butadiene is produced by mixing in the presence of a hydrocarob solvent (1) a nickel carboxylate or an organic complex of nickel, (2) $BF_3$ or a complex thereof, (3) an organometallic compound of an alkali metal or of a metal of Groups II and III, and (4) a conjugated diene, in such a way as the diene is added before components (1) and (3) react with each other, and ageing the mixture at 20–100° C. for e.g. 15 minutes, the molar ratio of the catalyst components being from 0.02 to 2 moles of the nickel compound, from 0.2 to 10 moles of the boron compound, and from 0.2 to 20 moles of the diene per one mole of the organometallic compound. It is also disclosed that the thus obtained catalyst gives a polybutadiene of high cis-1,4 content with a high polymerization velocity and that the molecular weight of the polymer can be controlled by the ageing temperature, the higher the temperature the higher the molecular weight of the polymer.

It has now been found that a catalyst prepared in accordance with the disclosures of the aforesaid copending application with the proviso that a relatively small amount of the diene compound is used and the ageing is carried out for a relatively long period of time would yield high cis-1,4 polybutadienes in which substantially no cold flow tendency is set up. According to this invention, the high cis-1,4 polybutadienes having a reduced cold flow tendency are produced by mixing in a hydrocarbon solvent (A) at least one organonickel compound selected from the group consisting of nickel carboxylates and organic complexes of nickel, (B) at least one boron compound selected from the group consisting of boron trifluoride and the organic complexes thereof and (C) at least one organoaluminum compound, in the presence of 0.5–50 moles of a conjugated diene per one mole of the aforesaid nickel compound, followed by ageing the mixture for at least 16 minutes at a temperature −20–120° C., and thereafter contacting a butadiene with the so obtained catalyst in a hydrocarbon solvent at a temperature −20–150° C. under an atmosphere of an inert gas.

The organonickel compounds which are suitably used in this invention are selected from the group consisting of nickel carboxylates and the organic complexes of nickel. The nickel carboxylates include formate, acetate, octate, octenate, palmitate, stearate, benzoate, ethyl benzoate, oxalate, succinate, sebacate, phthalate, naphthenate, rosinate and the like. Convenient organonickel complexes are those having carbon, nitrogen and/or oxygen atoms directly attached to the metal in the molecule, for example, carbonyl complexes such as nickel tetracarbonyl; hydroxyester complexes such as ethyl acetoacetate-nickel and derivatives thereof; hydroxyaldehyde complexes such as salicylaldehyde-nickel, salicylaldoxime-nickel and salicylaldehydeimine-nickel; hydroxyketone complexes such as acetylacetone-nickel; alphabenzoinoxime-nickel, o-hydroxyacetophenone-nickel, bis(1 - hydroxyxanthone) nickel, nickel piromeconicate and bis-(tropolono) nickel; isonitrile complexes such as tetraphenylisonitrile-nickel; dihydroxy-nickel complex; hydroxyquinone complexes such as bis(1-hydroxyanthraquinone) nickel; diketodioximo complexes such as bis-(dimethylglyoximo) nickel and bis-(alpha-furildioximo) nickel; hydroxybenzylamine complex; hydroxyazo complex; 1-hydroxyacridine complex; hydroxybenzoquinoline complex; nitrosonaphthol complex; amino acid complex; anthranyl complex; dithizone complex; bis(salicylaldehyde) ethylenediimine complex; amine complexes such as tris(ethylenediamine)nickel sulfate; and other complex compounds of nickel having mono- to hexa-dentate structures similar to those compounds. We prefer to use an organo-nickel compound selected from nickel naphthenate, nickel octenate, nickel palmitate, nickel stearate, nickel benzoate, nickel tetracarbonyl, acetoacetate nickel, salicylaldehyde-nickel, salicylaldehydeimine-nickel and acetylacetone-nickel.

The boron compounds to be used in this invention are selected from boron trifluoride and organic complexes thereof. When considered from the points of their ready availability, the etherates are most convenient, but the other complexes such as the complexes of boron trifluoride with either methanol, ethanol, phenol, acetic acid or ethyl formate can also be used.

The organoaluminum compounds to be used in this invention can be represented by the formula $$AlR_{3-n}X_n$$

wherein R is a monovalent hydrocarbyl group having less than eleven carbon atoms, X is halogen selected from fluorine, chlorine and bromine and bromine and $n$ is either 0 or the integer 1 or 2. Examples of suitable organoaluminum compuonds include triethylaluminum, triisobutylaluminum, diethylaluminum fluoride, diethylaluminum chloride, ethylaluminum dichloride, diisobutylaluminum bromide and triphenylaluminum. Of these, preferred is trialkylaluminum.

As regards the proportion in which these catalyst components are used, the boron and the organoaluminum compounds can be used in about 3–20 moles and about 2–10 moles, respectively, per 1 mole of the organonickel compound.

The conjugated diene compounds to be used along with the foregoing catalyst components in preparing the catalyst include butadiene, isoprene, dimethylbutadiene and the like. Of these, butadiene is most conveniently used.

The conjugated diene can be added in advance to one or more of the three components of the catalyst. When it is to be added to one of the components, it is an advantage from the standpoint of its preservation to add it to the organonickel compound. In the case of large scale operations, it also can be added to advantage to the catalyst components during the time the reaction between the components is proceeding.

In preparing the catalyst of this invention, the three components of the catalyst and the conjugated diene are mixed in a hydrocarbon solvent. The catalyst components and the diene are favorably charged in the form of a solution in said hydrocarbon solvent and then mixed therein. The sequence in which the three components and the diene are mixed is not critical. Useable as the hydrocarbon solvent are aromatic hydrocarbons such as benzene, toluene and xylene, aliphatic hydrocarbons such as pentane, hexane, heptane and octane, and alicyclic hydrocarbons such as cyclohexane and decalin.

The amount of the conjugated diene that is used in preparing the catalyst and the ageing conditions are important for obtaining a catalyst which can yield cis-1,4-polybutadienes having a reduced cold flow tendency. It was found that it was necessary to use 0.5 to 50 moles of the conjugated diene per 1 mole of the organonickel compound, and that the ageing of the mixture of the catalyst components and the conjugated diene in the hydrocarbon solvent must be carried out for at least 16 minutes at a temperature below 120° C. If the amount used of the conjugated diene during the preparation of the catalyst is less than 0.5 mole per 1 mole of the organonickel compound, the benefits of this invention cannot be enjoyed.

It is desirable, however, that the amount used of the conjugated diene does not exceed about 35 moles per 1 mole of the organonickel compound. We found that when the diene was used in an amount greater than 50 moles per 1 mole of the organonickel a catalyst which would yield polybutadienes having their cold flow tendency reduced to an extent as to be satisfactory could not be obtained no matter how the ageing conditions were selected.

Although it is preferred generally that the ageing temperature does not exceed 100° C., and particularly 80° C., in those cases where the amount used of the conjugated diene is in the neighborhood of hereinbefore indicated lower limit, an elevated ageing temperature such as 120° C. can also be used. If the ageing is carried out for a prolonged period of time at an excessively high temperature, highly polymerized substances are formed, and hence difficulties arise from the standpoints of equipment and operations. The lower limit of the ageing temperature is not so critical. If the ageing can be carried out for a sufficiently prolonged period of time, it can be performed at a low temperature of even −20° C., but normally an ageing temperature of not lower than 0° C. is an advantage.

The optimum ageing time will depend upon the ageing temperature and the amount used of the conjugated diene. The ageing time can be reduced as the ageing temperature becomes higher or as the amount used of the conjugated diene becomes smaller. In any event, it is necessary to carry out the ageing for at least 16 minutes, and in most cases the time is preferably at least 30 minutes.

The so prepared catalyst is then contacted in the liquid phase with the monomeric butadiene to be polymerized, in the presence of a hydrocarbon solvent, after which the polymerization reaction is carried out for the prescribed time at the specified temperature. The preparation of the catalyst as well as the polymerization reaction must be carried out completely under an atmosphere of an inert gas such as nitrogen, helium or carbon dioxide.

The catalyst can be normally used in an amount of about 0.025–2.6 mg. atom, calculated as nickel, per 100 grams of the monomeric butadiene.

The hydrocarbon solvent to be used for the polymerization reaction may be the same as that used for the preparation of the catalyst. The polymerization temperature used can range between −20° and 150° C., but for obtaining polymers containing the cis-1,4 structure in a high proportion, preferred is a temperature 0°–100° C., and particularly 20–80° C.

The polymerization reaction can be stopped at the stage in which the desired polymer has been obtained by the addition to the polymerization system of a catalyst inactivating agent such as water, alcohols, carboxylic acids and amines.

The solid polymer can be obtained either by adding a large amount of a poor solvent, such as alcohol, to the reaction mixture whose polymerization has been terminated, thus solidifying the polymer, or by azeotropically removing the solvent from the reaction mixture along with the water. In this case, an antioxidant such as phenyl-beta-naphthylamine (PBNA) can be added in advance to the reaction mixture or be dissolved in advance in the poor solvent such as alcohol. Further, extending oils and other chemicals can also be added, if necessary.

When analyzed by the method of D. Morero et al. [La Chimica e L'industrial, vol. 41, page 758 (1959)], the so obtained polymer contained normally above 90% of the cis1,4 structure. Butadiene polymer containing as high as 96% or more of the cis-1,4 structure could also be obtained readily.

According to this invention, the cold flow tendency which is inherent in high cis-1,4 polybutadiene can be reduced during the polymerization stage without the need of any special processing steps or equipment. The tendency to cold flow does not substantially occur in the high cis-1,4 polybutadiene obtained according to this invention. In addition, the tensile strength of this polybutadiene is high in its unvulcanized state and its processability shows an enhancement.

Further, since the physical properties and processability of cis-1,4 polybutadiene are greatly affected by its molecular weight, it is very important to adjust the molecular weight during the polymerization step. In this invention, the molecular weight of the resulting polymer can be adjusted over a broad range, i.e., a range of the order of 10–100 $ML_{1+4}$ (100° C.) according to the Mooney viscosity, this being made possible by varying the composition ratio of the catalyst and the ageing temperature during the preparation of the catalyst. Normally, the cold flow tendency of high cis-1,4 polybutadiene becomes low as the Mooney viscosity rises and on the other hand becomes high as the Mooney viscosity declines. Hence, it is believed that there exists a correlation between the cold flow tendency and the Mooney viscosity. The high cis-1,4 polybutadienes obtained according to this invention, however, do not have a relatively high cold flow tendency even though they are those having a relatively low Mooney viscosity. Hence, it seems that there is practically no relationship between the Mooney viscosity of the high cis-1,4 polybutadienes obtained according to this invention and their cold flow tendency.

The high cis-1,4 polybutadienes obtained by this invention are compounded, molded and vulcanized in customary manner and find wide use for such as tires, belts, footwear, industrial products and other uses.

The following examples are given to illustrate the invention more specifically, but these examples are not to be construed as limiting the invention.

In the examples, the cold flow tendency was determined in the following manner. Polybutadiene was extruded from a hole 6.35 mm. in diameter at a temperature of 50° C. and a pressure of 0.238 kg./cm.$^2$. The amount extruded was expressed in milligrams per minute. In this case, the polybutadiene was placed in the extruder and allowed to stand for 10 minutes to attain a steady state, then the rate was measured. It was observed that the value obtained according to this method was in exact agreement with the state of spontaneous deformation which takes place at room temperature.

Example 1

The catalyst was prepared using as catalyst components triethylaluminum, boron trifluoride diethyl ether and nickel naphthenate in the ratio of 6.5/7.2/1.0 (mole ratio) and in the presence of 6.1 moles of butadiene per 1 mole of the nickel naphthenate during the preparation of the catalyst, the ageing temperature and ageing period being varied. Using the so obtained catalyst in varied amounts, butadiene was polymerized.

The preparation of the catalyst and the polymerization operation, as carried out in Example 1, are described hereinafter. Examples 2–17 were also carried out likewise.

2.64 ml. of a toluene solution containing 0.5% by weight of butadiene and in which had been dissolved 0.0777 millimole (calculated on the basis of a molecular weight of 565) of nickel naphthenate were placed in a 340-ml. reaction bottle which was washed, dried and purged with nitrogen in advance. Then 1.92 ml. of a toluene solution containing 0.5% by weight of butadiene and in which had been dissolved 0.56 millimole of boron trifluoride diethyl ether was added, following which the reaction was carried out for 10 minutes at room temperature (25° C.).

This was followed by adding to this mixture 1.41 ml. of a toluene solution containing 0.5% by weight of butadiene and in which had been dissolved 0.503 millimole of triethylaluminum. The mixture was then aged for 65 minutes at 25° C.

The resulting catalyst solution was clear and exhibited an orange-brown color. Toluene and butadiene were added to this solution until their total amounts were 209 ml. (180 grams) and 48 ml. (30 grams), respectively. Following this, the reaction bottle was placed in a constant temperature bath, and the polymerization reaction was carried out at 40° C. for 2 hours. After completion of the polymerization reaction, the bottle was taken out, and to it was added phenyl-beta-naphthylamine (PBNA) in an amount corresponding to about one p.h.r. (parts by weight per 100 parts by weight of rubber) dissolved in 10 ml. of toluene. After shaking the bottle well, the contents were poured into 1.5 liters of isopropyl alcohol with vigorous stirring. The deposited polymer was taken out and dried on a roll at 110° C.

As control, butadiene was polymerized in exactly the same manner, excepting that the butadiene was not present during the preparation of the catalyst.

These polymer samples were tested for their Mooney viscosity and cold flow tendency. The results are shown in Table I.

TABLE I

| Experiment No. | Amount of catalyst used (mM.) (as nickel naphthenate) | Catalyst ageing conditions Temp. (°C.) | Catalyst ageing conditions Time (min.) | Rate of polymerization (percent) | Mooney viscosity [$ML_{1+4}$ (100° C.)] | Cold flow tendency (mg./min.) |
| --- | --- | --- | --- | --- | --- | --- |
| 1 | 0.0777 | 25 | 65 | 97.6 | 30.0 | 1.9 |
| 2 [1] | 0.0777 | 25 | 65 | 55.0 | 65.0 | 2.0 |
| 3 | 0.0777 | 25 | 120 | 97.5 | 32.5 | 1.3 |
| 4 | 0.0777 | 25 | 180 | 92.5 | 51.5 | 0.9 |
| 5 | 0.0777 | 25 | 240 | 96.5 | 39.0 | 0.8 |
| 6 | 0.0777 | 40 | 30 | 95.9 | 46.5 | 1.2 |
| 7 | 0.0777 | 40 | 60 | 92.8 | 51.0 | 0.6 |
| 8 [1] | 0.0777 | 40 | 60 | 40.1 | 77.0 | 0.7 |
| 9 | 0.0777 | 40 | 90 | 91.7 | 61.5 | 0.5 |
| 10 | 0.0972 | 40 | 90 | 87.6 | 39.0 | 0.6 |
| 11 | 0.0972 | 50 | 20 | 95.5 | 27.0 | 1.6 |
| 12 | 0.0972 | 50 | 40 | 92.5 | 40.0 | 0.3 |
| 13 [1] | 0.0972 | 50 | 40 | 59.0 | 61.5 | 2.2 |
| 14 | 0.1167 | 50 | 30 | 96.9 | 31.0 | 1.4 |
| 15 | 0.1167 | 50 | 60 | 97.0 | 38.0 | 0.2 |
| 16 | 0.1167 | 50 | 90 | 96.9 | 47.5 | 0.1 |
| 17 [1] | 0.1167 | 50 | 90 | 43.5 | 75.0 | 1.8 |

[1] Controls.

As is apparent from Table I, the polybutadienes obtained with the catalyst prepared using the proper ageing conditions of this invention have a greatly reduced cold flow tendency as compared with the polybutadienes obtained with the catalyst prepared without the presence of butadiene.

Example 2

Butadiene was polymerized as in Example 1, except that the amount of butadiene present during the preparation of the catalyst was varied and further in preparing the catalyst only nickel naphthenate was dissolved in the toluene containing butadiene in amounts of 0.5, 1.0 and 1.5% by weight, which solutions were then mixed with the toluene solutions of the other catalyst components.

The mole ratio of the catalyst components, the polymerization temperature, the polymerization time, the total amount of toluene and the total amount of butadiene were the same as in the case of Example 1.

The resulting polybutadienes were measured for their Mooney viscosity, cold flow tendency, microstructure and gel content. The gel content was determined in the following manner. Two grams of a sample were rolled thin, cut into small pieces and weighed, following which this was placed in a round-bottomed flask. 75 ml. of distilled water and 200 ml. of toluene were added thereto, and then after equipping the flask with a reflux condenser the flask was heated for 2 hours under reflux. The contents were then filtered with a 80-mesh stainless steel wire screen. After drying the wire screen for one hour, its increase in weight was determined. The gel portion was calculated by subtracting from this value 0.0010 gram as being the compensatory value for the nongel rubber portion adhering to the wire screen.

The results are shown in Table II. It is apparent from the results of Table II that high cis-1,4 polybutadienes in which substantially no cold flow tendency is set up can be produced according to this invention.

scribed in Table III, and a toluene solution consisting of about 2 ml. of toluene in which had been dissolved triethylaluminum were added in the order given, following which this mixture was aged under the conditions shown in Table III to prepare the catalyst. The molar ratio of the catalyst components was that used in Example 1.

The polymerization of butadiene was then carried out with the aforesaid catalyst, using the same polymerization temperature and time and total toluene and total butadiene as in the case with Example 1.

The resulting polybutadienes were tested for their Mooney viscosity and cold flow tendency. The results are shown in Table III.

As is apparent from the results shown in Table III, when the amount present of the butadiene during the preparation of the catalyst exceeds 50 moles per 1 mole of the nickel naphthenate, the polymerization velocity is accelerated but, on the other hand, it becomes difficult to reduce the cold flow tendency substantially.

TABLE III

| Experiment No. | Amount of catalyst used (mM.) (as nickel naphthenate) | Amount of butadiene present in catalyst (moles per mole of nickel naphthenate) | Ageing conditions | | Rate of Polymerization (percent) | | Mooney viscosity [ML$_{1+4}$(100° C.)] | Cold flow tendency (mg./min.) |
|---|---|---|---|---|---|---|---|---|
| | | | Temp. (° C.) | Time (min.) | 30 min. later | 2 hr. later | | |
| 1[1] | 0.1068 | 0 | 50 | 60 | 7.2 | 43.5 | 75.0 | 1.8 |
| 2 | 0.1167 | 5.4 | 50 | 60 | 58.0 | 98.5 | 53.5 | 0.2 |
| 3 | 0.1167 | 15 | 50 | 60 | 60.5 | 98.4 | 54.0 | 0.4 |
| 4 | 0.1650 | 30 | 50 | 60 | 61.3 | 98.8 | 55.5 | 0.6 |
| 5 | 0.1650 | 50 | 50 | 60 | 65.5 | 98.2 | 55.0 | 0.9 |
| 6 | 0.1650 | 85 | 50 | 60 | 68.0 | 99.0 | 52.0 | 1.3 |
| 7 | 0.1650 | 170 | 60 | 60 | 78.0 | 100.0 | 57.0 | 1.6 |

[1] Control in which butadiene was not present during the preparation of the catalyst.

Example 4

This experiment illustrates instances where the combinations of catalyst components were used as shown in Table 4.

TABLE II

| Experiment No. | Amount of catalyst used (mM.) (as nickel naphthenate) | Amount of butadiene present in catalyst (moles per mole of nickel naphthenate) | Catalyst ageing conditions | | Rate of polymerization (percent) | Mooney viscosity [ML$_{1+4}$(100° C.)] | Cold flow tendency (mg./min.) | Microstructure (percent) | | | Gel content (percent) |
|---|---|---|---|---|---|---|---|---|---|---|---|
| | | | Temp. (° C.) | Time (min.) | | | | Cis-1,4 | Trans 1,4 | Vinyl | |
| 1 | 0.1167 | 2.7 | 40 | 30 | 89.3 | 39.5 | 1.4 | | | | |
| 2 | 0.1359 | 2.7 | 40 | 60 | 91.6 | 49.5 | 0.7 | 96.5 | 2.0 | 1.5 | 0.03 |
| 3 | 0.1554 | 2.7 | 40 | 90 | 89.3 | 53.0 | 0.0 | | | | |
| 4[1] | 0.1554 | 0 | 40 | 90 | 65.0 | 53.5 | 2.8 | 96.4 | 2.0 | 1.6 | 0.05 |
| 5 | 0.1455 | 2.7 | 50 | 30 | 86.0 | 53.0 | 0.7 | | | | |
| 6 | 0.1650 | 2.7 | 50 | 60 | 93.0 | 58.5 | 0.4 | 96.7 | 1.8 | 1.5 | 0.03 |
| 7[1] | 0.1650 | 0 | 50 | 60 | 68.5 | 49.0 | 3.0 | | | | |
| 8 | 0.1845 | 2.7 | 50 | 90 | 89.1 | 63.0 | 0.1 | | | | |
| 9 | 0.0972 | 5.4 | 40 | 30 | 87.1 | 46.5 | 0.8 | 96.5 | 1.9 | 1.6 | 0.04 |
| 10 | 0.1167 | 5.4 | 40 | 60 | 93.9 | 39.5 | 0.6 | | | | |
| 11[1] | 0.1167 | 0 | 40 | 60 | 59.0 | 60.0 | 2.0 | | | | |
| 12 | 0.1359 | 5.4 | 40 | 90 | 93.9 | 52.0 | 0.1 | 96.3 | 2.1 | 1.6 | 0.10 |
| 13 | 0.1263 | 5.4 | 50 | 30 | 94.2 | 43.0 | 0.6 | | | | |
| 14 | 0.1455 | 5.4 | 50 | 60 | 95.2 | 50.5 | 0.2 | 96.3 | 2.1 | 1.6 | 0.05 |
| 15[1] | 0.1455 | 0 | 50 | 60 | 58.5 | 62.0 | 2.1 | | | | |
| 16 | 0.1650 | 5.4 | 50 | 90 | 94.0 | 50.5 | 0.0 | | | | |
| 17 | 0.0972 | 8.1 | 40 | 30 | 93.0 | 35.5 | 1.1 | | | | |
| 18 | 0.1167 | 8.1 | 40 | 60 | 93.8 | 38.5 | 0.7 | | | | |
| 19 | 0.1359 | 8.1 | 40 | 90 | 95.5 | 38.5 | 0.6 | 96.2 | 2.2 | 1.6 | 0.02 |
| 20 | 0.1167 | 8.1 | 50 | 30 | 94.0 | 40.5 | 0.7 | | | | |
| 21 | 0.1263 | 8.1 | 50 | 60 | 98.9 | 48.0 | 0.4 | 96.4 | 2.1 | 1.5 | 0.06 |
| 22[1] | 0.1263 | 0 | 50 | 60 | 48.5 | 69.5 | 1.9 | | | | |
| 23 | 0.1359 | 8.1 | 50 | 90 | 92.6 | 57.0 | 0.3 | | | | |

[1] Controls in which butadiene was not present during the preparation of the catalyst.

Example 3

This experiment illustrates instances where butadiene has been caused to be present in relatively large amounts during the preparation of the catalyst.

After placing 26 ml. of toluene in a reaction bottle, to toluene solution consisting of about 3 ml. of toluene in which had been dissolved nickel naphthenate in an amount as specified in Table III, a toluene solution consisting of about 2 ml. of toluene in which had been dissolved boron trifluoride diethyl ether, butadiene in an amount as pre- The catalysts were prepared as in Example 2 by dissolving each of the organic acid nickels shown in Table 4 into toluene containing 0.5% by weight of butadiene, mixing the solution with a solution of other catalyst components, and ageing at 50° C. for 60 minutes. With the use of this catalyst, butadiene was polymerized with the polymerization temperature, polymerization time, total amount of toluene and that of butadiene made the same as those of Example 1. Results are shown in Table 4.

TABLE IV

| Exp. No. | Organometal compound | | Boron trifluoride diethyl-ether (mM.) | Organic acid nickel | | Amount of butadiene in the catalyst (mole per mole of nickel naph-thenate) | Rate of polymeri-zation (percent) | Mooney viscosity [ML$_{1+4}$ (100° C.)] | Cold flow tendency (mg./min.) |
|---|---|---|---|---|---|---|---|---|---|
| | Kinds | Amount (mM.) | | Kinds | Amount (mM.) | | | | |
| 1 | Triethylaluminum | 0.753 | 0.837 | Nickel stearate | 0.1167 | 5.4 | 88.1 | 45.0 | 0.6 |
| 2[1] | do | 0.753 | 0.837 | do | 0.1167 | 0 | 61.6 | 55.0 | 3.1 |
| 3 | do | 0.753 | 0.837 | Acetacetyl ethyl nickel. | 0.1167 | 5.4 | 85.9 | 41.5 | 0.3 |
| 4[1] | do | 0.753 | 0.837 | do | 0.1167 | 0 | 75.3 | 52.5 | 2.6 |

[1] Controls where butadiene was not present at the time of preparation of a catalyst.

We claim:

1. A process for producing high cis-1,4 polybutadiene having a reduced cold flow tendency which comprises mixing (A) at least one organo-nickel compound selected from the group consisting of nickel carboxylates and organic complexes of nickel, (B) at least one boron compound selected from the group consisting of boron trifluoride and the organic complexes thereof, and (C) at least one organoaluminum compound, said mixing being effected in a hydrocarbon solvent in the presence of 0.5–50 moles of a conjugated diolefin per one mole of said nickel compound, followed by ageing said mixture for at least 16 minutes at a temperature ranging between —20° and 120° C. to prepare a catalyst, and thereafter contacting said catalyst with butadiene in a hydrocarbon solvent under an atmosphere of an inert gas at a temperature ranging between —20° and 150° C.

2. The process according to claim 1 wherein the mole ratio of said catalyst components, on the basis of one mole of said organonickel compound, is 3–20 moles of the boron compound and 2–10 moles of the organo-aluminum compound.

3. The process according to claim 1 wherein said catalyst components are mixed in a hydrocarbon solvent in the presence of 0.5–30 moles of said conjugated diolefin per one mole of said organonickel compound.

4. The process according to claim 1 wherein the ageing of the catalyst is effected for at least 30 minutes at a temperature ranging between 20° and 100° C.

5. The process according to claim 1 wherein the ageing of the catalyst is effected for at least 30 minutes at a temperature ranging between 20° and 80° C.

References Cited

UNITED STATES PATENTS

| 2,977,349 | 3/1961 | Brockway et al. | 260—94.3 |
| 3,177,183 | 4/1965 | Naylor et al. | 260—82.1 |
| 3,170,905 | 2/1965 | Ueda et al. | 260—94.3 |

JOSEPH L. SCHOFER, Primary Examiner

R. A. GAITHER, Assistant Examiner